US012586782B2

(12) United States Patent
Otaki et al.

(10) Patent No.: US 12,586,782 B2
(45) Date of Patent: *Mar. 24, 2026

(54) ACTIVE MATERIAL, ANODE LAYER, BATTERY, AND METHODS FOR PRODUCING THESE

(71) Applicant: TOYOTA JIDOSHA KABUSHIKI KAISHA, Toyota (JP)

(72) Inventors: Mitsutoshi Otaki, Susono (JP); Jun Yoshida, Mishima (JP); Masanori Harata, Kariya (JP); Yasuhiro Yamaguchi, Kariya (JP); Kota Urabe, Kariya (JP); Tatsuya Eguchi, Kariya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 709 days.

This patent is subject to a terminal disclaimer.

(21) Appl. No.: 17/939,412

(22) Filed: Sep. 7, 2022

(65) Prior Publication Data

US 2023/0090390 A1 Mar. 23, 2023

(30) Foreign Application Priority Data

| Sep. 17, 2021 | (JP) | 2021-151942 |
| May 11, 2022 | (JP) | 2022-077966 |

(51) Int. Cl.
H01M 4/38 (2006.01)
C01B 33/021 (2006.01)
(Continued)

(52) U.S. Cl.
CPC ........... H01M 4/386 (2013.01); C01B 33/021 (2013.01); H01M 4/0433 (2013.01);
(Continued)

(58) Field of Classification Search
CPC .............. C01B 33/021; C01P 2002/72; C01P 2002/74; C01P 2002/77; C01P 2006/14;
(Continued)

(56) References Cited

U.S. PATENT DOCUMENTS

| 6,402,774 B1 | 6/2002 | Caldironi |
| 11,088,367 B2 | 8/2021 | Kosaka et al. |

(Continued)

FOREIGN PATENT DOCUMENTS

| CN | 104105239 A | 10/2014 |
| CN | 112447972 A | 3/2021 |

(Continued)

OTHER PUBLICATIONS

Langer et al., Electrochemical Lithiation of Silicon Clathrate—II, Jul. 20, 2012, Journal of The Electrochemical Society, vol. 159 (Year : 2012).*

(Continued)

*Primary Examiner* — Tong Guo
*Assistant Examiner* — Jesse J Efymow
(74) *Attorney, Agent, or Firm* — Dinsmore & Shohl LLP

(57) ABSTRACT

A main object of the present disclosure is to provide an active material wherein a volume variation due to charge/discharge is small. The present disclosure achieves the object by providing an active material comprising a silicon clathrate II type crystal phase, including a void inside a primary particle, and a void amount A of the void with a fine pore diameter of 100 nm or less is more than 0.15 cc/g and 0.40 cc/g or less.

11 Claims, 2 Drawing Sheets

Silicon clathrate II type

Diamond type silicon

(51) Int. Cl.
   *H01M 4/04*      (2006.01)
   *H01M 10/0525*   (2010.01)
   *H01M 4/02*      (2006.01)

(52) U.S. Cl.
   CPC ..... *H01M 10/0525* (2013.01); *C01P 2002/72* (2013.01); *C01P 2002/74* (2013.01); *C01P 2002/77* (2013.01); *C01P 2006/14* (2013.01); *C01P 2006/16* (2013.01); *C01P 2006/40* (2013.01); *H01M 2004/021* (2013.01); *H01M 2004/027* (2013.01)

(58) Field of Classification Search
   CPC ............ C01P 2006/16; C01P 2006/40; H01M 4/0433; H01M 4/386; H01M 10/0525; H01M 2004/021; H01M 2004/027; Y02E 60/10
   See application file for complete search history.

(56)                References Cited

U.S. PATENT DOCUMENTS

| | | | |
|---|---|---|---|
| 11,600,817 | B2 | 3/2023 | Harata et al. |
| 11,799,076 | B2 | 10/2023 | Otaki et al. |
| 2002/0021170 | A1 | 2/2002 | Nakayama et al. |
| 2008/0253955 | A1 | 10/2008 | Leblanc et al. |
| 2012/0021283 | A1 | 1/2012 | Chan et al. |
| 2014/0308585 | A1 | 10/2014 | Han et al. |
| 2015/0376016 | A1 | 12/2015 | Krishna et al. |
| 2015/0380724 | A1* | 12/2015 | Chan .................... H01M 4/131 429/50 |
| 2018/0323631 | A1 | 11/2018 | Otaki et al. |
| 2020/0020929 | A1 | 1/2020 | Yoshida et al. |
| 2020/0020936 | A1 | 1/2020 | Yoshida et al. |
| 2020/0176768 | A1* | 6/2020 | Kosaka ................. H01M 4/386 |
| 2021/0020938 | A1 | 1/2021 | Yamaguchi et al. |
| 2021/0066713 | A1* | 3/2021 | Harata .................. H01M 4/381 |
| 2021/0066714 | A1 | 3/2021 | Harata et al. |
| 2021/0305556 | A1* | 9/2021 | Otaki .................... H01M 4/366 |
| 2021/0384498 | A1 | 12/2021 | Suzuki et al. |
| 2021/0391576 | A1 | 12/2021 | Otaki et al. |
| 2022/0393159 | A1 | 12/2022 | Abe |
| 2023/0086351 | A1 | 3/2023 | Harata et al. |
| 2023/0090390 | A1 | 3/2023 | Otaki et al. |
| 2023/0253557 | A1 | 8/2023 | Suzuki et al. |
| 2024/0021805 | A1 | 1/2024 | Otaki et al. |
| 2024/0030421 | A1 | 1/2024 | Mashimo et al. |
| 2024/0030422 | A1 | 1/2024 | Mashimo et al. |

FOREIGN PATENT DOCUMENTS

| | | | |
|---|---|---|---|
| JP | 2006-041134 | A | 2/2006 |
| JP | 2012-140266 | A | 7/2012 |
| JP | 2012-224488 | A | 11/2012 |
| JP | 2013-018679 | A | 1/2013 |
| JP | 2017-059534 | A | 3/2017 |
| JP | 2020-017513 | A | 1/2020 |
| JP | 2020-087886 | A | 6/2020 |
| JP | 2021-018981 | A | 2/2021 |
| JP | 3075306 | U | 2/2021 |
| JP | 2021-031349 | A | 3/2021 |
| JP | 2021-158003 | A | 10/2021 |
| JP | 2021-158004 | A | 10/2021 |
| JP | 2022-034998 | A | 3/2022 |
| JP | 2023-044620 | A | 3/2023 |
| KR | 10-2009-0053807 | A | 5/2009 |
| WO | 00/17104 | A1 | 3/2000 |
| WO | 01/17104 | A1 | 3/2001 |
| WO | 2008/031229 | A1 | 3/2008 |

OTHER PUBLICATIONS

Restriction Requirement dated Jun. 6, 2025, issued to U.S. Appl. No. 17/945,381.

Non-Final Office Action dated Jul. 1, 2025, issued to U.S. Appl. No. 17/945,381.

U.S. Appl. No. 17/729,725, filed Apr. 26, 2022.

Official Filing Receipt dated May 2, 2022, issued to U.S. Appl. No. 17/729,725.

Non-Final Office Action dated Jul. 14, 2023, issued to U.S. Appl. No. 17/729,725.

Notice of Allowance dated Jan. 24, 2024, issued to U.S. Appl. No. 17/729,725.

Ammar, et al., "On the Clathrate Form of Elemental Silicon, Si136: Preparation and Characterisation of NaxSi136 (x→0)," Solid State Sciences, May 2004, 6(5): 393-400, ISSN 1293-2558, https://doi.org/10.1016/j.solidstatesciences.2004.02.006, (https://www.sciencedirect.com/science/article/pii/S1293255804000317).

Arakawa, "Introduction to Particle Size Measurement," Journal of the Society of Powder Technology, Jun. 10, 1980, 17(6):299-307, Japan (with English translation of relevant Abstract).

Dopilka, et al., "Structural Origin of Reversible Li Insertion in Guest-Free, Type-II Silicon Clathrates," Adv. Energy Sustainability Res., Feb. 5, 2021, 2:2000114, https://doi.org/10.1002/aesr.202000114.

Dopilka, et al., Supporting Information: "Structural Origin of Reversible Li Insertion in Guest-Free, Type-II Silicon Clathrates," Adv. Energy Sustainability Res., Feb. 5, 2021, 2:2000114, https://doi.org/10.1002/aesr.202000114.

Horie, et al., "Controlled Thermal Decomposition of NaSi to Derive Silicon Clathrate Compounds," Journal of Solid State Chemistry, Jan. 2009, 182(1):129-135, ISSN 0022-4596, https://doi.org/10.1016/j.jssc.2008.10.007, (https://www.sciencedirect.com/science/article/pii/S0022459608005240).

Restriction Requirement dated Oct. 25, 2022, issued to U.S. Appl. No. 17/210,824.

Non-Final Office Action dated Dec. 6, 2022, issued to U.S. Appl. No. 17/210,824.

Notice of Allowance dated Jun. 21, 2023, issued to U.S. Appl. No. 17/210,824.

Non-Final Office Action dated Jul. 27, 2022, issued to U.S. Appl. No. 17/002,304.

Final Office Action dated Dec. 6, 2022, issued to U.S. Appl. No. 17/002,304.

Notice of Allowance dated Apr. 12, 2023, issued to U.S. Appl. No. 17/002,304.

Anno et al., "Mechanical Properties of Thermoelectric Ba8Al15Si31 Clalhrate Prepared by Combining Arc Melting and Spark Plasma Sintering Techniques," Journal of Electronic Materials, 2016, vol. 45, No. 3, pp. 1803-1812.

Karttunen et al., "Structural Principles of Semiconducting Group 14 Clathrate Frameworks," Inorganic Chemistry, 2011, 50, 1733-1742.

Ramachandran et al., "Synthesis and X-Ray Characterization of Silicon Clathrates," Journal of Solid State Chemistry, 1999, 145, 716-730.

* cited by examiner

Silicon clathrate II type

Diamond type silicon

ACTIVE MATERIAL, ANODE LAYER, BATTERY, AND METHODS FOR PRODUCING THESE

CROSS-REFERENCE TO RELATED APPLICATIONS

This application is based upon and claims the benefit of priority of the prior Japanese Patent Application No. 2021-151942, filed on Sep. 17, 2021, and Japanese Patent Application No. 2022-077966, filed on May 11, 2022, the entire contents of which are incorporated herein by reference.

TECHNICAL FIELD

The present disclosure relates to an active material, an anode layer, a battery, and methods for producing these.

BACKGROUND ART

In recent years, development of batteries has been actively undergone. For example, in automobile industries, the development of a battery to be utilized for a battery electronic vehicle (BEV) or a hybrid electric vehicle (HEV) has been advanced. Also, as an active material used in the battery, Si has been known.

For example, Patent Literature 1 discloses an all solid state battery system including an alloy based anode active material particle such as a silicon particle. Meanwhile, Patent Literature 2 discloses that a silicon clathrate may be calculatory used as an anode active material of a lithium ion battery. Also, Patent Literatures 3 and 4 disclose an active material comprising a silicon clathrate II type crystal phase, and including a void inside a primary particle.

CITATION LIST

Patent Literatures

Patent Literature 1: Japanese Patent Application Laid-Open (JP-A) No. 2017-059534
Patent Literature 2: U.S. Patent Application Laid-Open No. 2012/0021283 Specification
Patent Literature 3: JP-A No. 2021-158003
Patent Literature 4: JP-A No. 2021-158004

SUMMARY OF DISCLOSURE

Technical Problem

The theoretical capacity of Si is large, which is advantageous in high energy condensation of a battery. On the other hand, the volume variation of Si is large during charge/discharge.

The present disclosure has been made in view of the above circumstances, and a main object of the present disclosure is to provide an active material wherein a volume variation due to charge/discharge is small.

Solution to Problem

[1]
An active material comprising a silicon clathrate II type crystal phase, including a void inside a primary particle, and a void amount A of the void with a fine pore diameter of 100 nm or less is more than 0.15 cc/g and 0.40 cc/g or less.

[2]
An active material comprising a silicon clathrate II type crystal phase, including a void inside a primary particle, and a void amount B of the void with a fine pore diameter of 50 nm or less is more than 0.065 cc/g and 0.25 cc/g or less.

[3]
The active material according to [2], wherein the void amount A of the void with a fine pore diameter of 100 nm or less is 0.05 cc/g or more and 0.40 cc/g or less.

[4]
The active material according to any one of [1] to [3], wherein, as peaks of the silicon clathrate II type crystal phase, peak "A" at a position of $2\theta=20.09°\pm0.50°$ and peak "B" at a position of $2\theta=31.72°\pm0.50°$ are observed in X-ray diffraction measurement using a CuK$\alpha$ ray, and when an intensity of the peak "A" is regarded as $I_A$, an intensity of the peak "B" is regarded as $I_B$, and a maximum intensity in $2\theta=22°$ to $23°$ is regarded as $I_M$, $I_A/I_M$ is 1.75 or more and 2.00 or less, and $I_B/I_M$ is 1.35 or more and 1.75 or less.

[5]
An anode layer comprising the active material according to any one of [1] to [4].

[6]
A battery comprising a cathode layer, an anode layer, and an electrolyte layer placed between the cathode layer and the anode layer, and the anode layer is the anode layer according to [5].

[7]
A method for producing the active material according to any one of [1] to [4], the method comprising: an alloying step of obtaining a Na—Si alloy by reacting a Na source and a Si source; and a silicon clathrate forming step of forming a silicon clathrate II type crystal phase by heating the Na—Si alloy so as to reduce a Na amount in the Na—Si alloy, and in the silicon clathrate forming step, a scavenger that captures Na in the Na—Si alloy is used, and a particle wherein a void amount C of the void with a fine pore diameter of 50 nm or less is 0.02 cc/g or more and 0.20 cc/g or less, is used as the Si source.

[8]
A method for producing an anode layer, the method comprising: an active material producing step of producing an active material by the method for producing an active material according to [7], and an anode layer forming step of forming an anode layer using the active material.

[9]
The method for producing an anode layer according to [8], wherein the anode layer forming step includes a press treatment of pressing the anode layer in a thickness direction, and by the press treatment, a void amount D of the void with a fine pore diameter of 50 nm or less in the active material is adjusted to be 0.035 cc/g or more and 0.11 cc/g or less.

[10]
The method for producing an anode layer according to [9], wherein, by the press treatment, a void amount E of the void with a fine pore diameter of 100 nm or less in the active material is adjusted to be 0.053 cc/g or more and 0.16 cc/g or less.

[11]
A method for producing a battery, the method comprising: an active material producing step of producing an active material by the method for producing an active material according to [7], and an anode layer forming step of forming an anode layer using the active material.

Effects of Disclosure

The present disclosure exhibits effects such that an active material wherein a volume variation due to charge/discharge is small, may be obtained.

DESCRIPTION OF EMBODIMENTS

The active material, the anode layer, the battery, and the methods for producing these in the present disclosure are hereinafter described in detail.

A. Active Material

The active material in the present disclosure comprises a silicon clathrate II type crystal phase, including a void inside a primary particle, and a void amount A of the void with a fine pore diameter of 100 nm or less, or a void amount B of the void with a fine pore diameter of 50 nm or less, is high.

Figure 1A:
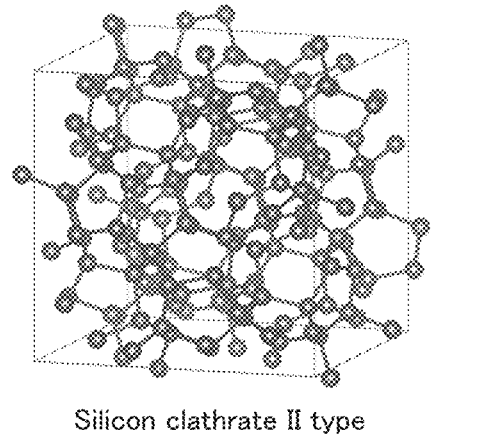
FIG. 1A is a schematic perspective views illustrating a Si clathrate II type crystal phase.

The active material in the present disclosure comprises a silicon clathrate II type crystal phase. In the silicon clathrate II type crystal phase, as shown in FIG. 1A, a polyhedron (cage) including a pentagon or a hexagon is formed with a plural of Si elements. This polyhedron has a space within thereof that is capable of including a metal ion such as a Li ion. By a metal ion being intercalated into this space, the volume variation due to charge/discharge may be suppressed. In an all solid state battery, particularly, a high confining pressure is generally needed to be applied in order to suppress the volume variation due to charge/discharge. However, the confining pressure may be reduced by using the active material in the present disclosure; as the result, an enlargement of a confining jig may be suppressed.

Figure 1B:
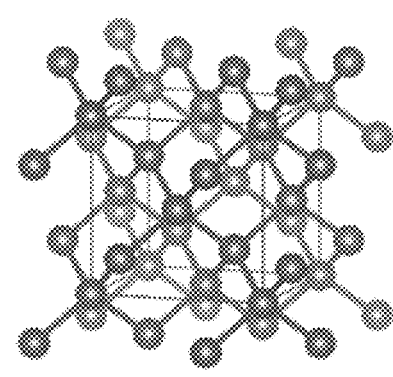
FIG. 1B is a schematic perspective view illustrating a diamond type Si crystal phase.

Meanwhile, a usual Si includes a diamond type crystal phase. In the diamond type Si crystal phase, as shown in FIG. 1B, a tetrahedron is formed with a plural of Si elements. Since the tetrahedron does not have a space within thereof that is capable of including a metal ion such as a Li ion, the volume variation due to charge/discharge is hardly suppressed. Therefore, the durability is likely to be deteriorated.

Also, the active material in the present disclosure includes a void inside a primary particle. As described above, since the silicon clathrate II type crystal phase has the cage capable of including a metal ion such as a Li ion, the volume variation due to charge/discharge may be suppressed. When the primary particle including the crystal phase includes the void inside thereof, since the void also contribute to the suppression of the volume variation, the volume variation due to charge/discharge may be further suppressed. Also, the active material in the present disclosure includes many minute voids with a fine pore diameter of 100 nm or less, or minute voids with a fine pore diameter of 50 nm or less. Therefore, the volume variation due to charge/discharge may be reduced evenly. Further, since many minute voids are included, the collapsing of the voids by pressing may be suppressed. Particularly, by employing the method for producing described later, the void amount A of the minute void with a fine pore diameter of 100 nm or less, or the void amount B of the minute void with a fine pore diameter of 50 nm or less is increased.

The active material in the present disclosure comprises a silicon clathrate II type crystal phase. The silicon clathrate II type crystal phase usually belongs to the space group (Fd-3m). The silicon clathrate II type crystal phase has a typical peak at a position of $2\theta=20.09°$, $21.00°$, $26.51°$, $31.72°$, $36.26°$, and $53.01°$ in X-ray diffraction measurement using a CuKα ray. These peak positions may vary respectively in a range of $\pm0.50°$, may vary in a range of $\pm0.30°$, and may vary in a range of $\pm0.10°$.

In some embodiments, the active material in the present disclosure comprises the silicon clathrate II type crystal phase as a main phase. "Comprising the silicon clathrate II type crystal phase as a main phase" indicates that, among the peaks observed in X-ray diffraction measurement, a peak belonging to the silicon clathrate II type crystal phase is the peak with the strongest diffraction intensity. The definition relating "main phase" is similar in other crystal phase.

In the silicon clathrate II type crystal phase, a peak at a position of $2\theta=20.09°\pm0.50°$ is regarded as peak "A", and a peak at a position of $2\theta=31.72°\pm0.50°$ is regarded as peak "B". Also, an intensity of the peak "A" is regarded as $I_A$, and an intensity of the peak "B" is regarded as $I_B$. Meanwhile, the maximum intensity in $2\theta=22°$ to $23°$ is regarded as $I_M$. Since a peak of the crystal phase related to Si does not usually appear in the range of $2\theta=22°$ to $23°$, it may be used as a standard.

In some embodiments, the value of $I_A/I_M$ is more than 1. When the value of $I_A/I_M$ is 1 or less, it may be determined that the silicon clathrate II type crystal phase is not substantially formed. The value of $I_A/I_M$ is, for example, 1.75 or more, and may be 1.80 or more. Meanwhile, the value of $I_A/I_M$ is, for example, 10 or less, may be 5 or less, may be 2.00 or less, and may be 1.95 or less.

In some embodiments, the value of $I_B/I_M$ is more than 1. When the value of $I_B/I_M$ is 1 or less, it may be determined that the silicon clathrate II type crystal phase is not substantially formed. The value of $I_B/I_M$ is, for example, 1.35 or more, may be 1.40 or more, and may be 1.45 or more. Meanwhile, the value of $I_B/I_M$ is, for example, 7 or less, may be 4 or less, may be 1.75 or less, and may be 1.70 or less.

In some embodiments, the active material in the present disclosure includes no diamond type Si crystal phase; however, it may be slightly included. The diamond type Si crystal phase has a typical peak at a position of $2\theta=28.44°$, $47.31°$, $56.10°$, $69.17°$, and $76.37°$, in an X-ray diffraction measurement using a CuKα ray. These peak positions may be shifted respectively in a range of $\pm0.50°$, may be shifted in a range of $\pm0.30°$, and may be shifted in a range of $\pm0.10°$.

When peak "C" is observed as a peak of the diamond type Si crystal phase at a position of $2\theta=28.44°\pm0.50°$, an intensity of the peak "C" is regarded as $I_C$. The value of $I_A/I_C$ is, for example, more than 1, may be 1.5 or more, may be 2 or more, and may be 3 or more. In some embodiments, the range of $I_B/I_C$ is similar to the range of $I_A/I_C$.

In some embodiments, the active material in the present disclosure includes no silicon clathrate I type crystal phase. The silicon clathrate I type crystal phase usually belongs to the space group (Pm-3n). The silicon clathrate I type crystal phase has a typical peak at a position $2\theta=19.44°$, $21.32°$, $30.33°$, $31.60°$, $32.82°$, $36.29°$, $52.39°$, and $55.49°$ in X-ray diffraction measurement using a CuKα ray. These peak positions may be shifted respectively in a range of ±0.50°, may be shifted in a range of ±0.30°, and may be shifted in a range of ±0.10°. "Including no crystal phase" may be confirmed by the peak of the crystal phase not being confirmed in the X-ray diffraction measurement.

Examples of the shape of the active material in the present disclosure may include a granular shape. The active material may be a primary particle, and may be a secondary particle wherein the primary particles are agglutinated. In either case, the active material usually includes a void inside the primary particle.

In some embodiments, the active material in the present disclosure includes many minute voids with a fine pore diameter of 100 nm or less. The void amount (integrated hole volume) A of the void with a fine pore diameter of 100 nm or less is, for example, 0.05 cc/g or more, may be 0.07 cc/g or more, may be 0.10 cc/g or more, and may be 0.12 cc/g or more. Also, the void amount A is, for example, more than 0.12 cc/g, and may be more than 0.15 cc/g. Meanwhile, the void amount A is, for example, 0.40 cc/g or less, may be 0.39 cc/g or less, may be 0.35 cc/g or less, may be 0.30 cc/g or less, may be 0.25 cc/g or less, may be 0.24 cc/g or less, and may be 0.23 cc/g or less. The void amount A may be determined by, for example, a mercury porosimeter measurement, a BET measurement, a gaseous adsorption method, 3D-SEM, and 3D-TEM. The method for measuring a void amount other than the void amount A is similar thereto.

In some embodiments, the active material in the present disclosure includes many minute voids with a fine pore diameter of 50 nm or less. The voids with a fine pore diameter of 50 nm or less may further suppress the collapsing of the voids by pressing, compared with the void with a fine pore diameter more than 50 nm and 100 nm or less. The void amount B of the void with a fine pore diameter of 50 nm or less is, for example, 0.05 cc/g or more, may be more than 0.065 cc/g, may be 0.072 cc/g or more, may be 0.10 cc/g or more, may be 0.105 cc/g or more, may be 0.11 cc/g or more, and may be 0.15 cc/g or more. Meanwhile, the void amount B is, for example, 0.25 cc/g or less, may be 0.22 cc/g or less, may be 0.17 cc/g or less, may be 0.165 cc/g or less, and may be 0.16 cc/g or less.

In some embodiments, the active material in the present disclosure includes many minute voids with a fine pore diameter of 10 nm or less. The voids with a fine pore diameter of 10 nm or less may reduce the confining pressure increase, since it is capable of storing the deposited Li at a high filling rate, compared with the void with a fine pore diameter more than 10 nm and 50 nm or less. The void amount X of the void with a fine pore diameter of 10 nm or less is, for example, 0.015 cc/g or more, may be 0.0167 cc/g or more, may be 0.020 cc/g or more, and may be 0.023 cc/g or more. Meanwhile, the void amount X is, for example, 0.09 cc/g or less. Incidentally, the void amount X may be 0.0337 cc/g or less.

The active material in the present disclosure includes a void inside a primary particle. The void ratio is, for example, 4% or more, and may be 10% or more. Also, the void ratio is, for example, 40% or less, and may be 20% or less. The void ratio may be determined by, for example, the following procedure. First, a cross-section of an electrode layer including an active material is obtained by conducting an ion milling process thereto. Then, the cross-section is observed with a SEM (scanning electron microscope), and a photograph of the particle is taken. In the obtained photograph, the silicon part and the void part are rigidly distinguished and digitalize with an image analyzing software. The areas of the silicon part and the void part are determined, and the void ratio (%) is calculated from the below described formula.

$$\text{Void ratio } (\%) = 100 \times (\text{void part area})/((\text{silicon part area}) + (\text{void part area}))$$

The specific image analyzing and the calculation of the void ratio may be conducted as described below. As the image analyzing software, for example, Fiji ImageJ bundled with Java 1.8.0_172 (hereinafter, Fiji) is used. The image is colorized into an RGB color image by combining a secondary electron image and a reflection electron image in the same field of view. Then, in order to eliminate the noise of each pixel, the obtained RGB image is blurred with the function of Fiji "Median (filter size=2)". Next, using Fiji, the silicon part and the void part in the SEM image are colored in different colors, so as to calculate the void amount from the area ratio of the silicon part and the void part.

Incidentally, in relation to the colorizing into the RGB color image, since both of the secondary electron image and the reflection electron image are displayed in a grayscale, the brightness "x" of each pixel in the secondary electron image is assigned to Red value, and the brightness "y" in the reflection electron image is similarly assigned to Green value, for example. Thereby, colorizing into an RGB color image is carried out as, for example, R=x, G=y, B=(x+y)/2 per pixel.

The average particle size ($D_{50}$) of the primary particle is, for example, 50 nm or more, may be 100 nm or more, and may be 150 nm or more. Meanwhile, the average particle size ($D_{50}$) of the primary particle is, for example, 3000 nm or less, may be 1500 nm or less, and may be 1000 nm or less. Also, the average particle size ($D_{50}$) of the secondary particle is, for example, 1 μm or more, may be 2 μm or more, and may be 5 μm or more. Meanwhile, the average particle size ($D_{50}$) of the secondary particle is, for example, 60 μm or less, and may be 40 μm or less. Incidentally, the average particle size ($D_{50}$) may be determined by observation with a SEM, for example. In some embodiments, the number of the sample is large; for example, 20 or more, may be 50 or more, and may be 100 or more.

In some embodiments, the composition of the active material in the present disclosure is not particularly limited, and is a composition represented by $Na_xSi_{136}$, wherein $0 \le x \le 24$. The "x" may be 0, and may be more than 0. Meanwhile, the "x" may be 20 or less, may be 10 or less, and may be 5 or less. Incidentally the active material in the present disclosure may include an inevitable component (such as Li). The composition of the active material may be determined by, for example, EDX, XRD, XRF, ICP, and an atomic absorption spectrometry. The composition of other compound may be measured similarly. Incidentally, an inevitable oxide layer is generally formed on the surface of the active material. Therefore, the active material may include a slight amount of O (oxygen). Also, the active material may include a slight amount of C (carbon) deriving from a manufacturing process.

The active material in the present disclosure is usually used for a battery. In some embodiments, the active material in the present disclosure may be an anode active material, may be a cathode active material. In the present disclosure, an electrode layer (anode layer or cathode layer) including the above described active material, and a battery including the electrode layer may be provided. Examples of the method for producing an active material may include the method for producing described in "D. Method for producing active material" described later.

B. Anode Layer

The anode layer in the present disclosure includes the above described active material.

According to the present disclosure, by using the above described active material, the anode layer may be an anode layer wherein a volume variation due to charge/discharge is small.

The anode layer is a layer including at least an anode active material. The anode active material may be in the same contents as those described in "A. Active material" above; thus, the description herein is omitted. When a press treatment is carried out during the production of the anode layer, the void existing inside a primary particle in the anode active material is collapsed in some cases. In the anode active material included in the anode layer, the void amount D and the void amount E described later may be in a predetermined range. The proportion of the anode active material in the anode layer is, for example, 20 weight % or more, may be 30 weight % or more, and may be 40 weight % or more. When the proportion of the anode active material is too low, a sufficient energy density may not be obtained. Meanwhile, the proportion of the anode active material is, for example, 80 weight % or less, may be 70 weight % or less, and may be 60 weight % or less. When the proportion of the anode active material is too high, an ion conductivity and an electron conductivity in the anode layer may be reduced, relatively.

The anode layer may include at least one of an electrolyte, a conductive material, and a binder as required. Examples of the electrolyte may include the electrolyte which will be described in "C. Battery, 3. Electrolyte layer" later. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include rubber-based binders and fluorine-based binders.

The thickness of the anode layer is, for example, 0.1 μm or more and 1000 μm or less. The anode layer in the present disclosure is usually used for a battery.

C. Battery

Figure 2:
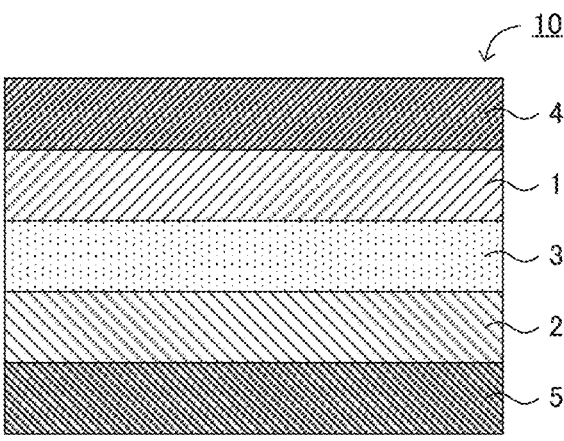
FIG. 2 is a schematic cross-sectional view illustrating an example of a battery in the present disclosure.

FIG. 2 is a schematic cross-sectional view illustrating an example of the battery in the present disclosure. Battery 10 shown in FIG. 2 comprises cathode layer 1, anode layer 2, electrolyte layer 3 placed between cathode layer 1 and anode layer 2, cathode current collector 4 for collecting currents of cathode layer 1, and anode current collector 5 for collecting currents of anode layer 2. In the present disclosure, anode layer 2 is the anode layer described in "B. Anode layer" above.

According to the present disclosure, by using the anode layer described above, the battery may be a battery wherein a volume variation due to charge/discharge is small.

1. Anode Layer

The anode layer in the present disclosure may be in the same contents as those described in "B. Anode layer" above; thus, the description herein is omitted.

2. Cathode Layer

The cathode layer is a layer including at least a cathode active material. Also, the cathode layer may include at least one of an electrolyte, a conductive material, and a binder, as necessary.

Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

A coating layer including a Li ion conductive oxide may be formed on the surface of the oxide active material. The reason therefor is to suppress the reaction of the oxide active material with the solid electrolyte (particularly sulfide solid electrolyte). Examples of the Li ion conductive oxide may include $LiNbO_3$. The thickness of the coating layer is, for example, 1 nm or more and 30 nm or less. Also, $Li_2S$ may be used, for example, as the cathode active material.

Examples of the shape of the cathode active material may include a granular shape. The average particle size ($D_{50}$) of the cathode active material is not particularly limited; and is, for example, 10 nm or more, and may be 100 nm or more. Meanwhile, the average particle size ($D_{50}$) of the cathode active material is, for example, 50 μm or less, and may be 20 μm or less. The average particle size ($D_{50}$) may be calculated from the measurement by, for example, a laser diffraction type particle size distribution meter, and a scanning electron microscope (SEM).

The electrolyte, the conductive material and the binder used for the cathode layer may be in the same contents as those described in "B. Anode layer" above; thus, the description herein is omitted. The thickness of the cathode layer is, for example, 0.1 μm or more and 1000 μm or less.

3. Electrolyte Layer

The electrolyte layer is a layer formed between the cathode layer and the anode layer, and includes at least an electrolyte. The electrolyte may be a solid electrolyte, and may be an electrolyte solution (liquid electrolyte).

Examples of the solid electrolyte may include inorganic solid electrolytes such as sulfide solid electrolyte, oxide solid electrolyte, nitride solid electrolyte, and halide solid electrolyte; and organic polymer electrolytes such as polymer electrolyte. Examples of the sulfide solid electrolyte may include solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element. The sulfide solid electrolyte may be a glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$.

In some embodiments, the liquid electrolyte includes a supporting salt and a solvent. Examples of the supporting salt (lithium salt) of the liquid electrolyte having lithium ion conductivity may include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$. $LiN(C_2F_5SO_2)_2$, $LiN(FSO_2)_2$, and $LiC(CF_3SO_2)_3$. Examples of the solvent used for the liquid electrolyte may include cyclic esters (cyclic carbonates) such as ethylene carbonate (EC), propylene carbonate (PC), and butylene carbonate (BC); and chain esters (chain carbonates) such as dimethyl carbonate (DMC), diethyl carbonate (DEC), and ethylmethyl carbonate (EMC). In some embodiments, the liquid electrolyte includes two kinds or more of the solvents.

The thickness of the electrolyte layer is, for example, 0.1 μm or more and 1000 μm or less.

4. Other Constitutions

In some embodiments, the battery in the present disclosure comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon.

The battery in the present disclosure may further include a confining jig that applies a confining pressure along the thickness direction, to the cathode layer, the electrolyte layer and the anode layer. In some embodiments, when the electrolyte layer is a solid electrolyte layer, the confining pressure is applied in order to form a favorable ion conductive path and an electron conductive path. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The kind of the battery in the present disclosure is not particularly limited; and typically a lithium ion battery. Also, the battery in the present disclosure may be a liquid battery in which a liquid electrolyte is included as the electrolyte layer, and may be an all solid state battery in which a solid electrolyte layer is included as the electrolyte layer. In some embodiments, the battery in the present disclosure may be a primary battery and may be a secondary battery; above all, the secondary battery so as to be repeatedly charged and discharged, and be useful as a car-mounted battery, for example.

The battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

D. Method for Producing Active Material

Figure 3:
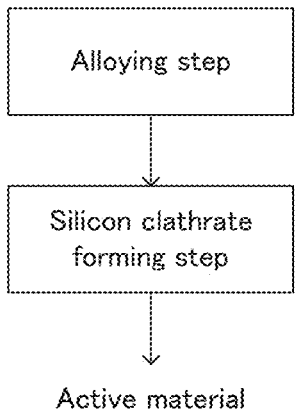
FIG. 3 is a flow chart illustrating an example of the method for producing an active material in the present disclosure.

FIG. 3 is a flow chart illustrating an example of the method for producing an active material in the present disclosure. In the method for producing shown in FIG. 3, a Na—Si alloy is firstly obtained by reacting a Na source and a Si source (an alloying step). On this occasion, a particle wherein a void amount C of the void with a fine pore diameter of 50 nm or less is high, is used as the Si source. Next, a silicon clathrate II type crystal phase is formed by heating the Na—Si alloy so as to reduce a Na amount in the Na—Si alloy (silicon clathrate forming step). On this occasion, a scavenger that captures Na in the Na—Si alloy is used. Thereby, an active material wherein at least one of the void amount A and the void amount B described above is in a predetermined range, and includes a silicon clathrate II type crystal phase, is obtained.

According to the present disclosure, an active material wherein a volume variation due to charge/discharge is small, may be obtained by using a predetermined Si source in the alloying step, and further using a predetermined scavenger in the silicon clathrate forming step.

1. Alloying Step

The alloying step in the present disclosure is a step of obtaining a Na—Si alloy by reacting a Na source and a Si source. In the alloying step, a particle wherein a void amount C of the void with a fine pore diameter of 50 nm or less is 0.02 cc/g or more and 0.20 cc/g or less, is used as the Si source.

The Si source is a particle including at least Si. The Si source may be a Si simple substance, and may be an alloy of Si and another metal. In some embodiments, when the Si source is an alloy, the alloy includes Si as a main component. The ratio of Si in the alloy is, for example, 50 at % or more, may be 70 at % or more, and may be 90 at % or more.

In some embodiments, the Si source is a porous Si including many voids inside a primary particle. In the Si source, the void amount C of the void with a fine pore diameter of 50 nm or less is usually 0.02 cc/g or more, may be 0.05 cc/g or more, may be 0.10 cc/g or more, may be 0.11 cc/g or more, and may be 0.12 cc/g or more. Meanwhile, the void amount C is usually 0.20 cc/g or less, and may be 0.19 cc/g or less. Also, BET specific surface area of the Si source is, for example, 20 $m^2/g$ or more, may be 25 $m^2/g$ or more, and may be 30 $m^2/g$ or more. Meanwhile, BET specific surface area of the Si source is, for example, 200 $m^2/g$ or less. The average particle size ($D_{50}$) of the Si source is, for example, 0.5 μm or more and 10 μm or less.

Examples of a method for producing the Si source (porous Si) may include a method wherein an alloy of Mg and Si(Mg—Si alloy) is produced, and then, Mg is removed from the Mg—Si alloy. The Mg—Si alloy may be obtained by, for example, heating a mixture of Mg and Si. The ratio of Mg with respect to Si(Mg/Si) is, for example, 1.0 or more, may be 1.5 or more, and may be 2.0 or more. Meanwhile, Mg/Si is, for example, 6.0 or less. Examples of a method for removing Mg from the Mg—Si alloy may include a method wherein Mg in the Mg—Si alloy is changed to MgO by heating the Mg—Si alloy under an inert gas atmosphere including oxygen, and then, MgO is removed with an acid solution. Examples of the acid solution may include an aqueous solution including hydrochloric acid (HCl) and hydrogen fluoride (HF).

Also, examples of a method for producing a Si source (porous Si) may include a method wherein an alloy of Li and Si(Li—Si alloy) is produced, and then, Li is removed from the Li—Si alloy. The Li—Si alloy may be obtained by, for example, mixing Li and Si. The ratio of Li with respect to Si(Li/Si) is, for example, 1.0 or more, may be 2.0 or more, may be 3.0 or more, and may be 4.0 or more. Meanwhile, Li/Si is, for example, 8.0 or less. Examples of a method for removing Li from the Li—Si alloy may include a method wherein the Li—Si alloy is reacted with a Li extracting agent. Examples of the Li extracting agent may include alcohols such as methanol, ethanol, 1-propanol, 1-butanol, 1-pentanol, and 1-hexanol; and acids such as acetic acid, formic acid, propionic acid, and oxalic acid.

Also, examples of a method for producing a Si source (porous Si) may include a method wherein an alloy of Mg and Si(Mg—Si alloy) is produced, then, Mg is removed from the Mg—Si alloy, then, an alloy of Si from which Mg was removed and Li(Li—Si alloy) is produced, and then, Li is removed from the Li—Si alloy.

Meanwhile, the Na source includes at least Na. Examples of the Na source may include metallic Na, NaH, and a metallic Na dispersion wherein a particle of metallic Na is dispersed in oil.

Examples of a method for obtaining a Na—Si alloy by reacting a Na source and a Si source may include a method wherein a mixture including a Na source and a Si source is heated. The heating temperature is, for example, 300° C. or more, may be 310° C. or more, may be 320° C. or more, and may be 340° C. or more. Meanwhile, the heating temperature is, for example, 800° C. or less, may be 600° C. or less, and may be 450° C. or less. In some embodiments, the alloying step is carried out under an inert gas atmosphere such as an Ar atmosphere.

In some embodiments, the Na—Si alloy includes a Zintl phase. The Zintl phase has a typical peak at a position of $2\theta=16.10°$, $16.56°$, $17.64°$, $20.16°$, $27.96°$, $33.60°$, $35.68°$, $40.22°$, and $41.14°$ in X-ray diffraction measurement using a CuKα ray. These peak positions may vary respectively in a range of $\pm0.50°$, and may vary in a range of $\pm0.30°$. In some embodiments, the Na—Si alloy includes the Zintl phase as a main phase. The Na—Si alloy may or may not include a silicon clathrate I type crystal phase.

In some embodiments, the composition of the Na—Si alloy is not particularly limited, and is a composition represented by $Na_zSi_{136}$, wherein $121\leq z\leq151$. The "$z$" may be 126 or more, and may be 131 or more. Meanwhile, the "$z$" may be 141 or less. An element other than Na and Si may exist in the Na—Si alloy. Examples of another element may include Li, K, Rb, Cs, Ba, Ga, and Ge.

2. Silicon Clathrate Forming Step

The silicon clathrate forming step in the present disclosure is a step of forming a silicon clathrate II type crystal phase by heating the Na—Si alloy so as to reduce a Na amount in the Na—Si alloy. In the silicon clathrate forming step, a scavenger that captures Na in the Na—Si alloy is used.

An example of the scavenger may include a Na getter that react with vapor of Na generated from the Na—Si alloy. For example, the Na getter is placed in a state not in contact with the Na—Si alloy. Examples of the Na getter may include SiO, $MoO_3$, and FeO. In some embodiments, when the Na getter is used, the silicon clathrate forming step is carried out under reduced pressure atmosphere.

Other Examples of the scavenger may include a Na trapping agent that receives Na by directly reacting with the Na—Si alloy. For example, the Na trapping agent is placed in a state in contact with the Na—Si alloy. Examples of the Na trapping agent may include $CaCl_2$, $AlF_3$, $CaBr_2$, $CaI_2$, $Fe_3O_4$, FeO, $MgCl_2$, ZnO, $ZnCl_2$, and $MnCl_2$. When the Na trapping agent is used, the silicon clathrate forming step may be carried out under reduced pressure atmosphere, and may be carried out under ordinary pressure.

The heating temperature in the silicon clathrate forming step is, for example, 100° C. or more, may be 200° C. or more, and may be 270° C. or more. Meanwhile, the heating temperature is, for example, 500° C. or less, and may be 400° C. or less.

3. Active Material

The active material obtained by each of the above described step comprises a silicon clathrate II type crystal phase. Also, the active material includes a void inside a primary particle. In some embodiments, for the range of the void amount of the active material, the range of $I_A/I_M$ and $I_B/I_M$, and other matters, the contents described in "A. Active material" above may be appropriately referred.

E. Method for Producing Anode Layer

The present disclosure provides a method for producing an anode layer, the method comprising an active material producing step of producing an active material by the above described method for producing an active material, and an anode layer forming step of forming an anode layer using the active material.

According to the present disclosure, by using the above described active material, an anode layer wherein a volume variation due to charge/discharge is small, may be obtained. The active material producing step may be in the same contents as those described in "D. Method for producing active material" above. Also, the method for forming an anode layer is not particularly limited, and a known method may be adopted. Examples of a method for forming an anode layer may include a method wherein an anode current collector is coated with a slurry including at least an active material, and dried.

When forming the anode layer, a press treatment of pressing the anode layer in the thickness direction may be carried out. Examples of the press treatment may include a roll press, and a plate press. When the pressure in the press treatment is high, the void in the anode active material may be collapsed. However, when the void amount C described above is high, the collapsing of the voids by pressing may further be suppressed. By the press treatment, the void amount D of the void with a fine pore diameter of 50 nm or less in the active material may be adjusted to be 0.035 cc/g or more and 0.11 cc/g or less. Also, by the press treatment, the void amount D may be adjusted to be 0.04 cc/g or more, may be 0.06 cc/g or more, and may be 0.08 cc/g or more. Meanwhile, by the press treatment, the void amount D may be adjusted to be 0.105 cc/g or less, and may be 0.10 cc/g or less. Also, the ratio of the void amount D with respect to the void amount C (D/C) is usually less than 1, and may be 0.7 or less. Meanwhile, D/C is, for example, 0.3 or more, and may be 0.35 or more. Incidentally, when the pressure in the press treatment is not so high, D/C will be approximately 1.

Also, by the press treatment, the void amount E of the void with a fine pore diameter of 100 nm or less in the active material may be adjusted to be 0.053 cc/g or more and 0.16 cc/g or less. Also, by the press treatment, the void amount E may be adjusted to be 0.09 cc/g or more and 0.14 cc/g or less.

In some embodiments of the obtained anode layer, the contents described in "B. Anode layer" above may be appropriately referred.

F. Method for Producing Battery

The present disclosure provides a method for producing a battery, the method comprising: an active material producing step of producing an active material by the above described method for producing an active material, and an anode layer forming step of forming an anode layer using the active material.

According to the present disclosure, by using the above described active material, a battery wherein a volume variation due to charge/discharge is small, may be obtained. The active material producing step and the anode layer forming step may be in the same contents as those described in "D. Method for producing active material" and "E. Method for producing anode layer" above. Also, the method for forming a battery is not particularly limited, and a known method may be adopted. Besides the active material producing step and the anode layer forming step, the method for producing a battery in the present disclosure may include the following steps; a cathode layer forming step of forming a cathode layer, an electrolyte layer forming step of forming an electrolyte layer, and placing step of placing a cathode layer, an electrolyte layer, and an anode layer in this order. In some embodiments of the obtained battery, the contents described in "C. Battery" above may be appropriately referred.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

As a Si source, Si powder (Si powder including no void inside the primary particle, SIE23PB, from Kojundo Chemical Lab. Co., Ltd.) was prepared. Using this Si source, a Na—Si alloy was produced using NaH as a Na source. Incidentally, NaH previously washed with hexane was used. The Na source and the Si source were weighed so as to be 1.05:1 in molar ratio, and mixed these using a cutter mill. This mixture was heated under conditions of 400° C. for 40 hours under an Ar atmosphere in a heating furnace to obtain a Na—Si alloy in powder form.

Further, using the obtained Na—Si alloy, a silicon clathrate forming step by a solid-phase method was carried out using $AlF_3$ as a Na trapping agent. The Na—Si alloy and the $AlF_3$ were weighed so as to be 1:0.35 in molar ratio, mixed using a cutter mill, and obtained a reaction raw material. The obtained reaction raw material in powder form was charged into a stainless steel reacting container, and was heated and reacted under conditions of 310° C. for 60 hours under an Ar atmosphere in a heating furnace. The obtained reaction product is believed to include an object active material, and NaF and Al as by-products. This reaction product was washed using a mixed solvent obtained by mixing $HNO_3$ and $H_2O$ by volume ratio of 90:10. Thereby, the By-products in the reaction product were removed. After washing, the solid component obtained by a filtration was dried at 120° C. for 3 hours or more to obtain an active material in powder form.

Example 2

Mg powder and Si powder were weighed so as to be 2.02:1 in molar ratio, mixed in a mortar, heated and reacted under conditions of 580° C. for 12 hours under an Ar atmosphere in a heating furnace. The resultant was cooled to the room temperature to obtained $Mg_2Si$ in ingot form. The $Mg_2Si$ was pulverized by a ball mill using 3 mm diameter zirconia balls under conditions of 300 rpm for 3 hours. Then, the pulverized $Mg_2Si$ was heated under conditions of 580° C. for 12 hours in a heating furnace under a mixture gas flow including Ar and $O_2$ at volume ration of 95:5, so as to react the oxygen in the mixture gas and $Mg_2Si$. The obtained reaction product is believed to include Si and MgO. This reaction product was washed using a mixed solvent including $H_2O$, HCl and HF by volume ratio of 47.5:47.5:5. Thereby, the oxide layer on the Si surface and the MgO in the reaction product were removed. After washing, the solid component obtained by a filtration was dried at 120° C. for 3 hours or more to obtain a porous Si in powder form. An active material was obtained in the same manner as in Example 1 except that the obtained porous Si was used as the Si source, instead of the Si powder.

Example 3

Metallic Li and Si powder were weighed so as to be 4:1 in molar ratio, and were reacted by mixing for 0.5 hours in a mortar under conditions of under an Ar atmosphere under the room temperature. Thereby, $Li_4Si$ was obtained. The obtained $Li_4Si$ was reacted with ethanol under an Ar atmosphere. The obtained reaction product is believed to include Si and $CH_3CH_2OLi$. The solid component obtained by a filtration of this reaction product was dried at 120° C. for 3 hours or more to obtain a porous Si in powder form. An active material was obtained in the same manner as in Example 1 except that the obtained porous Si was used as the Si source, instead of the Si powder.

Comparative Example 1

Using Si particles as the Si source and Na particles as the Na source, the Si particles and the Na particles were mixed so as to be 1:1 in the molar ratio, projected into a melting pot, the pot was sealed under an Ar atmosphere, and heated at 700° C. so as to obtain a Na—Si alloy. Using the obtained Na—Si alloy, Na was removed by heating at 340° C. under vacuum (approximately 1 Pa), so as to obtain an intermediate including a silicon clathrate II type crystal phase. The obtained intermediate and metallic Li were weighed so as Li/Si=1.7 in molar ratio, and mixed in a mortar under an Ar atmosphere so as to obtain an alloy compound. By reacting the obtained alloy compound with ethanol under an Ar atmosphere, a void was formed inside a primary particle so as to obtain an active material.

[Evaluation]

<XRD Measurement>

Figure 4:
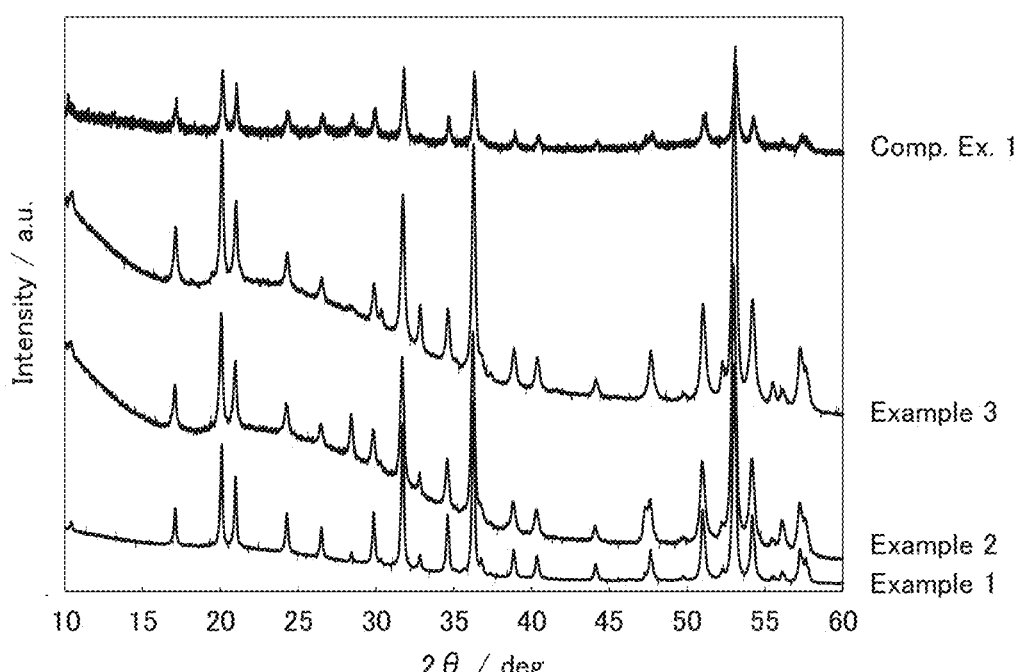
FIG. 4 is the result of an XRD measurement for the active materials obtained in Examples 1 to 3 and Comparative Example 1.

An X-ray diffraction (XRD) measurement using a CuKα ray was conducted to the active materials obtained in Examples 1 to 3 and Comparative Example 1. As the result, it was confirmed that the silicon clathrate II type crystal phase was included as a main phase in every active material as illustrated in FIG. 4.

Also, in the silicon clathrate II type crystal phase, the intensity of the peak "A" located at a position in the vicinity of $2\theta=20.09°$ was regarded as $I_A$, the intensity of the peak "B" located at a position in the vicinity of $2\theta=31.72°$ was regarded as $I_B$. Also, the maximum intensity in $2\theta=22°$ to $23°$ was regarded as $I_M$, $I_A/I_M$ and $I_B/I_M$ were determined. The results are shown in Table 1.

<Void Amount Measurement>

The void amount of the Si source (base material) used in Examples 1 to 3 and Comparative Example 1 was determined. Similarly, the void amount of the active material obtained in Examples 1 to 3 and Comparative Example 1 was determined. A mercury porosimeter was used for the measurement of the void amount. Pore Master 60-GT (from Quanta Chrome Co.) was used as a measuring device, and the measurement was carried out in a range of 40 Å to 4,000,000 Å. Washburn method was used for analysis. The results are shown in Table 1.

TABLE 1

| | Void amount C of base material (0-50 nm) cc/g | Void amount B of anode active material (0-50 nm) cc/g | Void amount A of anode active material (0-100 nm) cc/g | $I_A/I_M$ | $I_B/I_M$ |
|---|---|---|---|---|---|
| Example 1 | 0.02 | 0.072 | 0.10 | 3.33 | 3.80 |
| Example 2 | 0.13 | 0.107 | 0.23 | 1.89 | 1.64 |
| Example 3 | 0.19 | 0.157 | 0.21 | 1.82 | 1.49 |
| Comp. Ex. 1 | 0.03 | 0.065 | 0.11 | 2.76 | 2.8 |

As shown in Table 1, the void amount B in Example 1 was higher than that in Comparative Example 1. Also, the void amount A and the void amount B in Examples 2 and 3 were higher than that in Comparative Example 1. Also, $I_A/I_M$ and $I_B/I_M$ were more than 1 in all of Examples 1 to 3 and Comparative Example 1, and it was confirmed that the silicon clathrate II type crystal phase was formed. Also, as shown in Examples 2 and 3, an active material high in the void amount A and the void amount B was obtained by forming the base material high in the void amount C into a clathrate.

Also, in Comparative Example 1, Si was formed into a clathrate (Na alloying and Na removing treatment), and then, was formed into a porous material. In this case, when the amount of Li used in forming into a porous material was increased, the silicon clathrate II type crystal phase may disappear in some cased. Therefore, the Li amount to be used is limited. In contrast to this, in Examples 2 and 3, Si was formed into a porous material, and then, was formed into a clathrate. In this case, the amount of Li used in forming into a porous material may be increased, enabling to form the object sufficiently porous. Meanwhile, when sufficiently porous Si was formed into a clathrate at a high temperature, minute voids may disappear in some cased. In contrast to this, in Examples 2 and 3, the formation of the clathrate was possible at low temperature, by using a scavenger. It is presumed that the active material obtained in Examples 2 and 3 was high in the void amount A and the void amount B as the result of the above.

Example 4

An all solid state battery was produced using the active material obtained in Example 1 as the anode active material.

<Production of Anode>

The active material obtained in Example 1, a sulfide solid electrolyte ($Li_2S—P_2S_5$ based glass ceramic) a conductive material (VGCF), a butyl butyrate solution containing a PVDF-based binder at the ratio of 5 weight % and a butyl butyrate were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 30 minutes. The obtained mixture was pasted on an anode current collector (a Cu foil, from UACJ Corp.) by a blade method using an applicator, dried for 30 minutes on a hot plate adjusted to be 100° C. An anode including an anode current collector and an anode layer was obtained in the above manner.

<Production of Cathode>

A cathode active material ($LiNi_{1/3}Co_{1/3}Mn_{1/3}O_2$, average particle size of 6 µm), a sulfide solid electrolyte ($Li_2S—P_2S_5$ based glass ceramic), a conductive material (VGCF), a butyl butyrate solution containing a PVDF-based binder at the ratio of 5 weight % and a butyl butyrate were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 3 minutes. The obtained mixture was pasted on a cathode current collector (an Al foil, from Showa Denko Co., Ltd.) by a blade method using an applicator, dried for 30 minutes on a hot plate adjusted to be 100° C. A cathode including a cathode current collector and a cathode layer was obtained in the above manner. Incidentally, the area of the cathode was made smaller than the area of the anode.

<Production of Solid Electrolyte Layer>

A sulfide solid electrolyte ($Li_2S—P_2S_5$ based glass ceramic), a heptane solution containing a butylene rubber based binder at the ratio of 5 weight %, and a heptane were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 30 minutes. The obtained mixture was pasted on a release sheet (an Al foil) by a blade method using an applicator, dried for 30 minutes on a hot plate adjusted to be 100° C. A transfer member including the release sheet and a solid electrolyte layer was obtained in the above manner.

<Production of All Solid State Battery>

A solid electrolyte layer for joining was placed on the cathode layer of the cathode, set in a roll press machine, and pressed under 100 kN/cm at 165° C. Thereby, a first stacked body was obtained.

Next, the anode was set in a roll press machine, and pressed under 60 kN/cm at 25° C. Thereby, a pressed anode was obtained. Then, the solid electrolyte layer for joining and the transfer member were placed in this order from the anode layer side. On this occasion, the solid electrolyte layer for joining and the solid electrolyte layer of the transfer member were placed so as to face to each other. The obtained stacked body was set in planner uniaxial press machine, temporary pressed for 10 seconds under 100 MPa at 25° C. Then, the release sheet was peeled off from the solid electrolyte layer. Thereby, a second stacked body was obtained.

Next, the solid electrolyte layer for joining of the first stacked body and the solid electrolyte layer of the second stacked body were placed so as to face to each other, set in planner uniaxial press machine, pressed for 1 minute under 200 MPa at 120° C. Thereby, an all solid state battery was obtained.

Example 5

An all solid state battery was obtained in the same manner as in Example 4 except that the active material obtained in Example 2 was used as the anode active material.

Example 6

An all solid state battery was obtained in the same manner as in Example 4 except that the active material obtained in Example 3 was used as the anode active material.

Comparative Example 2

An all solid state battery was obtained in the same manner as in Example 4 except that the active material obtained in Comparative Example 1 was used as the anode active material.

Evaluation

<Void Amount Measurement>

The void amount of the anode active material in the pressed anode produced in Examples 4 to 6 and Comparative Example 2 was determined. The method for measuring a void amount is similar to that described above. The results are shown in Table 2.

<Confining Pressure Increase Measurement>

The confining pressure increase was measured by charging the all solid state batteries obtained in Examples 4 to 6 and Comparative Example 2. The test conditions were the confining pressure (constant size) of 5 MPa, charging at 0.1 C, and cutoff voltage of 4.55 V. The confining pressure at 4.55 V was measured, and the confining pressure increase from the state before the charge was determined. The results are shown in Table 2. Incidentally, the results of the confining pressure increase in Table 2 are relative values when the result in Comparative Example 2 is regarded as 100.

TABLE 2

| | Void amount D of anode active material (0-50 nm) cc/g | Void amount E of anode active material (0-100 nm) cc/g | Confining pressure increase (relative value) |
|---|---|---|---|
| Example 4 | 0.041 | 0.053 | 70 |
| Example 5 | 0.044 | 0.12 | 58 |
| Example 6 | 0.097 | 0.11 | 19 |
| Comp. Ex. 2 | 0.030 | 0.13 | 100 |

As shown in Table 2, it was confirmed that the confining pressure increase in Examples 4 to 6 was lower than that in Comparative Example 2. It is presumed that this is because the anode active material obtained in Examples 4 to 6 included may minute voids with a fine pore diameter of 50 nm or less, even after pressing.

Example 7

A powder porous Si was obtained in the same manner as in Example 3. An active material was obtained in the same manner as in Example 1 except that the obtained porous Si was used as the Si source instead of the Si powder, and the heating condition after adding $AlF_3$ was changed from 310° C. for 60 minutes to 310° C. for 120 hours.

Example 8

A powder porous Si was obtained in the same manner as in Example 3. An active material was obtained in the same manner as in Example 1 except that the obtained porous Si was used as the Si source instead of the Si powder, and the heating condition after adding $AlF_3$ was changed from 310° C. for 60 minutes to 290° C. for 120 hours.

Example 9

A powder porous Si was obtained in the same manner as in Example 3. An active material was obtained in the same manner as in Example 1 except that the obtained porous Si was used as the Si source instead of the Si powder. Then, the obtained active material was washed by immersing thereof in HF aqueous solution for 3 hours (HF washing).

Example 10

A powder porous Si (first porous Si) was obtained in the same manner as in Example 2. A powder porous Si (second porous Si) was obtained in the same manner as in Example 3 except that the obtained first porous Si was used instead of the Si powder. An active material was obtained in the same manner as in Example 1 except that the obtained second porous Si was used as the Si source instead of the Si powder.

Example 11

The second porous Si was obtained in the same manner as in Example 10. An active material was obtained in the same manner as in Example 1 except that the obtained second porous Si was used as the Si source instead of the Si powder, and the heating condition after adding $AlF_3$ was changed from 310° C. for 60 minutes to 270° C. for 120 hours.

Example 12

An active material was obtained in the same manner as in Example 10. Then, the obtained active material was washed by immersing thereof in HF aqueous solution for 3 hours (HF washing).

Evaluation

<XRD Measurement>

An X-ray diffraction (XRD) measurement using a CuKα ray was conducted to the active materials obtained in Examples 7 to 12. As the result, it was confirmed that the silicon clathrate II type crystal phase was included as a main phase in all the active materials.

Also, in the silicon clathrate II type crystal phase, the intensity of the peak "A" located at a position in the vicinity of $2\theta=20.09°$ was regarded as $I_A$, the intensity of the peak "B" located at a position in the vicinity of $2\theta=31.72°$ was regarded as $I_B$. Also, the maximum intensity in $2\theta=22°$ to $23°$ was regarded as $I_M$, and $I_A/I_M$ and $I_B/I_M$ were determined. The results are shown in Table 3.

<Void Amount Measurement>

The void amount of the active material obtained in Examples 7 to 12 was determined. The method for measuring the void amount was similar to that described above. The results are shown in Table 3. Also, for Example 9, the void amount of the anode active material in the pressed anode was determined. As the result, the void amount D of the void with a fine pore diameter of 50 nm or less was 0.110 cc/g, and the void amount E of the void with a fine pore diameter of 100 nm or less was 0.156 cc/g.

<Confining Pressure Increase Measurement>

Using the active materials obtained in Examples 7 to 12, all solid state batteries were obtained respectively in the same manner as in Example 4. The confining pressure increase was measured by charging the obtained all solid state batteries. The test conditions were similar to those described above. The results are shown in Table 3. Incidentally, the results of the confining pressure increase in Table 3 are relative values when the result in Comparative Example 2 is regarded as 100.

TABLE 3

| | Void amount B of anode active material (0-50 nm) cc/g | Void amount A of anode active material (0-100 nm) cc/g | $I_A/I_M$ | $I_B/I_M$ | Confining pressure increase (relative value) |
|---|---|---|---|---|---|
| Example 7 | 0.217 | 0.253 | 2.6 | 1.8 | 35 |
| Example 8 | 0.107 | 0.135 | 2.1 | 1.4 | 28 |
| Example 9 | 0.171 | 0.248 | 9.7 | 6.9 | 16 |
| Example 10 | 0.101 | 0.130 | 4.8 | 3.4 | 26 |
| Example 11 | 0.083 | 0.120 | 2.1 | 1.6 | 23 |
| Example 12 | 0.112 | 0.390 | 4.7 | 3.5 | 56 |

As shown in Table 3, it was confirmed that the confining pressure increase in Examples 7 to 12 was lower compared to Comparative Example 2. The reason therefor is presumed that the active materials obtained in Examples 7 to 12 included many minute voids with the fine pore diameter of 50 nm or less, even after the pressing.

REFERENCE SIGNS LIST

1 . . . cathode layer
2 . . . anode layer

3 . . . electrolyte layer

4 . . . cathode current collector

5 . . . anode current collector

10 . . . battery

What is claimed is:

1. An active material comprising:

a primary particle comprising a silicon clathrate II type crystal phase; and a void inside the primary particle, wherein:

a void amount A of the void with a fine pore diameter of 100 nm or less is more than 0.15 cc/g and 0.40 cc/g or less, and the active material is produced by a method comprising:

an alloying step of obtaining a Na—Si alloy by reacting a Na source and a Si source; and a silicon clathrate forming step of forming the silicon clathrate II type crystal phase by heating the Na—Si alloy so as to reduce a Na amount in the Na—Si alloy, wherein:

in the silicon clathrate forming step, a scavenger that captures Na in the Na—Si alloy is used, and a particle wherein a void amount C of a void with a fine pore diameter of 50 nm or less is 0.05 cc/g or more and 0.20 cc/g or less, is used as the Si source.

2. An active material comprising a silicon clathrate II type crystal phase, a primary particle comprising a silicon clathrate II type crystal phase; and a void inside the primary particle, wherein:

a void amount B of the void with a fine pore diameter of 50 nm or less is more than 0.10 cc/g and 0.25 cc/g or less, and the active material is produced by a method comprising:

an alloying step of obtaining a Na—Si alloy by reacting a Na source and a Si source; and a silicon clathrate forming step of forming the silicon clathrate II type crystal phase by heating the Na—Si alloy so as to reduce a Na amount in the Na—Si alloy, wherein:

in the silicon clathrate forming step, a scavenger that captures Na in the Na—Si alloy is used, and a particle wherein a void amount C of a void with a fine pore diameter of 50 nm or less is 0.05 cc/g or more and 0.20 cc/g or less, is used as the Si source.

3. The active material according to claim 2, wherein a void amount A of the void with a fine pore diameter of 100 nm or less is 0.05 cc/g or more and 0.40 cc/g or less.

4. The active material according to claim 1, wherein, as peaks of the silicon clathrate II type crystal phase, peak "A" at a position of $2\theta=20.09°+0.50°$ and peak "B" at a position of $2\theta=31.72°+0.50°$ are observed in X-ray diffraction measurement using a CuKα ray, and when an intensity of the peak "A" is regarded as $I_A$, an intensity of the peak "B" is regarded as $I_B$, and a maximum intensity in $2\theta=22°$ to $23°$ is regarded as $I_M$, $I_A/I_M$ is 1.75 or more and 2.00 or less, and $I_B/I_M$ is 1.35 or more and 1.75 or less.

5. An anode layer comprising the active material according to claim 1.

6. A battery comprising a cathode layer, an anode layer, and an electrolyte layer placed between the cathode layer and the anode layer, and the anode layer is the anode layer according to claim 5.

7. A method for producing the active material according to claim 1, the method comprising:

an alloying step of obtaining a Na—Si alloy by reacting a Na source and a Si source; and a silicon clathrate forming step of forming a silicon clathrate II type crystal phase by heating the Na—Si alloy so as to reduce a Na amount in the Na—Si alloy, wherein:

in the silicon clathrate forming step, a scavenger that captures Na in the Na—Si alloy is used, and a particle wherein a void amount C of a void with a fine pore diameter of 50 nm or less is 0.05 cc/g or more and 0.20 cc/g or less, is used as the Si source.

8. A method for producing an anode layer, the method comprising:

an active material producing step of producing an active material by the method for producing an active material according to claim 7, and an anode layer forming step of forming an anode layer using the active material.

9. The method for producing an anode layer according to claim 8, wherein the anode layer forming step includes a press treatment of pressing the anode layer in a thickness direction, and by the press treatment, a void amount D of the void with a fine pore diameter of 50 nm or less in the active material is adjusted to be 0.035 cc/g or more and 0.11 cc/g or less.

10. The method for producing an anode layer according to claim 9, wherein, by the press treatment, a void amount E of the void with a fine pore diameter of 100 nm or less in the active material is adjusted to be 0.053 cc/g or more and 0.16 cc/g or less.

11. A method for producing a battery, the method comprising:

an active material producing step of producing an active material by the method for producing an active material according to claim 7, and an anode layer forming step of forming an anode layer using the active material.

* * * * *